Figure 1:
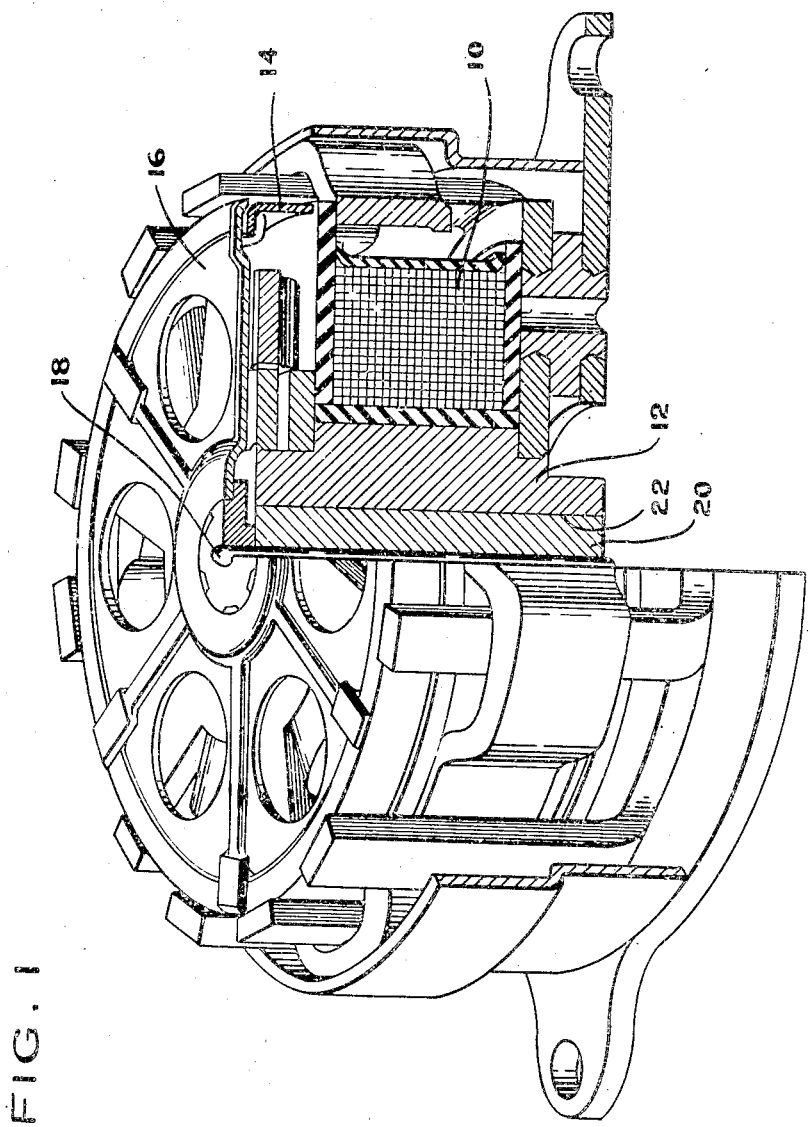

May 17, 1949. L. D. RICHARDSON 2,470,264
ELECTRIC MOTOR BEARING
Filed Jan. 18, 1947 2 Sheets-Sheet 1

INVENTOR
LLOYD D. RICHARDSON
BY
Toulmin & Toulmin
ATTORNEYS

May 17, 1949.   L. D. RICHARDSON   2,470,264
ELECTRIC MOTOR BEARING
Filed Jan. 18, 1947   2 Sheets-Sheet 2

INVENTOR
LLOYD D. RICHARDSON
BY
Toulmin & Toulmin
ATTORNEYS

Patented May 17, 1949

2,470,264

UNITED STATES PATENT OFFICE 2,470,264

ELECTRIC MOTOR BEARING

Lloyd D. Richardson, Dayton, Ohio, assignor to Hansen Manufacturing Company, Inc., Princeton, Ind., a corporation of Indiana Application January 18, 1947, Serial No. 722,860

1 Claim. (Cl. 172—36)

This invention relates to a composite article of manufacture and to a method of manufacturing the same. More particularly, this invention is concerned with the manufacture of a combined magnetic and journaling member and to improved methods of manufacturing the said member.

In the manufacture of small electric motors, and especially small synchronous motors for clocks, timers and similar purposes, it is necessary that the rotating element be accurately journaled with as friction-free a support as possible. In most motors of this type the shaft of a rotating member extends through the field structure so that the bearing therefor is mounted in and supported by the core of the magnetic field structure.

It has been found that the usual methods of mounting bearings in a motor of this type is attendant with difficulties because of the accurate alignment necessary to produce satisfactory operating conditions in the motor, and also because of the close tolerances to which such bearings should be formed. Due to the small size of the shaft being journaled, it is very difficult to true up the bearings after mounting by reaming or similar work operations. Furthermore, ordinary bearings which require a liquid lubricant, are subject to expansion and contraction with varying temperatures which effects the operation of the motor, and in extremely low temperatures, the lubricant will thicken and absorb a disproportionately large amount of power from the rotating member.

The principal object of the present invention is to overcome the foregoing difficulties by providing an improved bearing member for electric motors of this type.

Another object is to provide a combined bearing member and magnetic core for electrical equipment of the type of small electric motors.

A further object of this invention is the provision of an improved method of making a combined bearing and magnetic core member for electrical equipment.

Still another object is to provide a method of making a magnetic core member and combined bearing element such that a combined article can readily be made to any desired configuration.

It is a still further object of this invention to provide a method of molding a combined magnetic and bearing member from a particulate material which bonds into an integral unit upon the application of heat and pressure.

Figure 2:
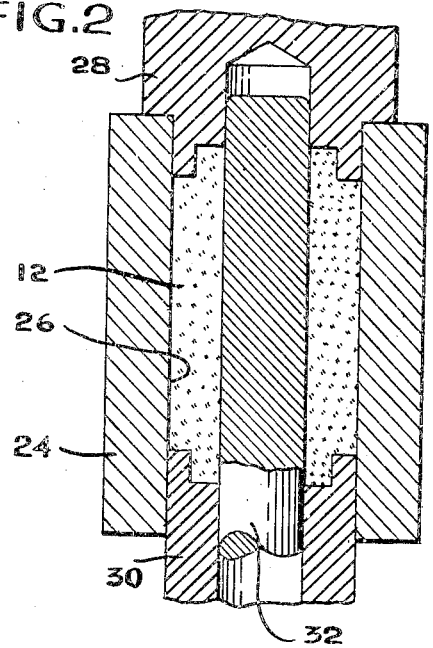
Figure 4:
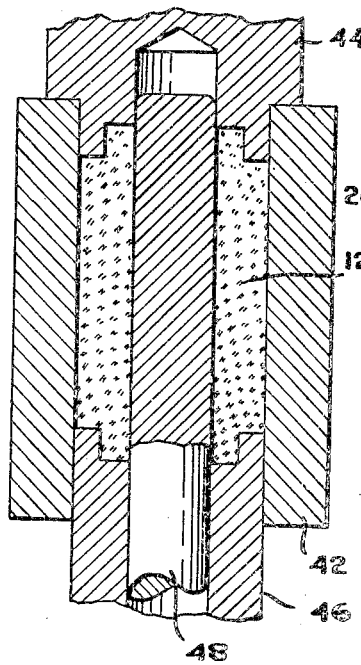
Figure 5:
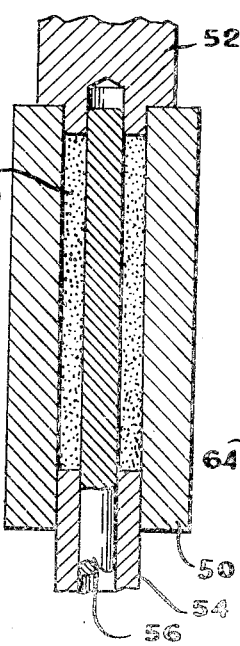
Figure 6:
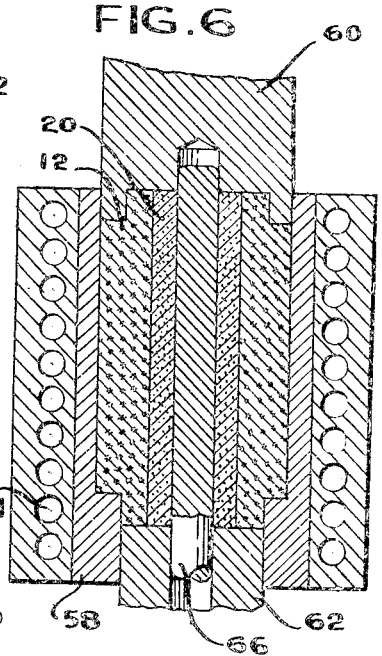

These and other objects and advantages will become more apparent upon reference to the following description taken in connection with the accompanying drawings in which:

Figure 1 is a perspective view partly broken away of a piece of electrical equipment adapted for using a work member manufactured according to this invention;

Figures 2 an 3 are sectional views showing one method of making a work member according to this invention; and Figures 4, 5 and 6 are sectional views showing another method of making a work member according to this invention.

Referring to Figure 1, there is shown an electric motor in which a coil 10 energizes a magnetic circuit which includes the core member 12. The magnetic circuit includes an air gap within which the magnetic band 14 of a rotor 16 rotates. Rotor 16 has a supporting shaft 18 which is journaled in a bearing member 20 which is supported in the central axial bore 22 of the core member 12. Electric motors of this type are well-known in the art and a full understanding of their construction and operation may be had upon reference to the W. L. Hansen et al. Patent No. 2,256,711 patented September 23, 1941, or to the W. L. Hansen et al. Patent No. 2,298,373 patented October 13, 1942.

It is important that the rotor shaft 18 be accurately journaled in order to maintain the magnetic band 14 accurately positioned in the motor field. Since the power generated by a motor of this type is quite small, it is essential that the bearing for the rotor shaft be as friction-free as possible, and also that changes in ambient temperature do not adversely affect the journaling properties thereof.

According to this invention, the bearing material is formed of a plastic bonded metal powder including a substantial amount of graphite powder or flakes. A preferred mixture consists of from 40% to 60% graphite, 20% to 30% metal powder and 20% to 30% plastic binder. The metal powder may comprise any suitable substance such as brass, bronze or iron, and the plastic binder may be any of several materials but is preferably a thermal setting compound such as Bakelite. A bearing of this type is substantially free of expansion and contraction due to varying temperatures, requires no liquid lubricant, and may be molded to a very accurate size.

In operation, the graphite particles coat both the shaft and the surface of the bearing, filling up any slight irregularities therein so that a smooth, long wearing surface results.

It has been found advantageous to form the bearing 20 and core 12 by also molding the core member from a mixture of iron powder and plastic material. Since the core member is a portion of the magnetic circuit of the motor, it is necessary to employ a magnetic powder in its construction, and any metal powder having a suitably high permeability may be employed for this purpose. In compounding the mixture to be used for molding the core, it is preferable to use at least 6% plastic binder, the remainder of the mixture consisting of magnetic material. The plastic binder employed is preferably a thermal setting material having no filler therein and, as in the case of the bearing member, Bakelite forms an adequate binding material. Among the magnetic materials which may be employed in the core are pure iron powder, powdered alloys of iron, and powdered magnetic compounds such as Permalloy, powdered Alnico and similar substances well-known in the art.

Figure 3:
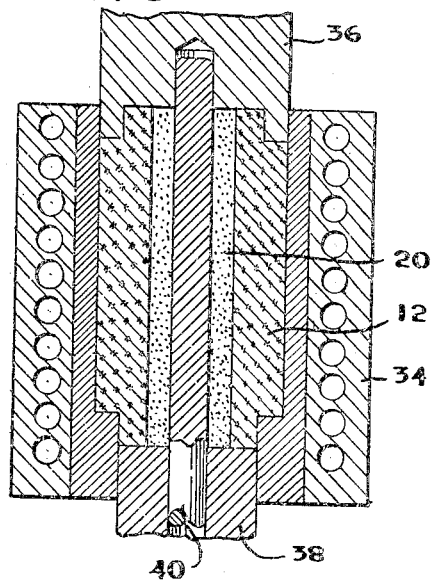

In forming the combined article of manufacture either of two preferred methods may be followed. The first of these is illustrated in Figures 2 and 3 wherein there is shown a mold 24 which has a cavity 26 into which extend the upper and lower punch members 28 and 30, respectively. A core member 32 traverses the cavity 26 and defines, together with the punches 28 and 30, the configuration of the core member 12. In forming the core, the granulated material being used is placed in the cavity 26 and compacted therein between the punches 28 and 30.

Thereafter, the briquette so formed may be removed from the die 24 and placed in another die 34 into which extend the upper and lower punches 36 and 38, respectively, and the cavity of which is traversed by the core rod 40. The core rod 40 is substantially the same size as the shaft 18 of the motor and defines an annular cavity with the briquetted magnetic core member. Into this cavity is placed the material which it is desired to form the bearing of, and pressure is applied to briquette the said bearing to substantially the same consistency as the surrounding core briquette. Thereafter, heat is applied to the combination briquette to soften the plastic binding material and, by means of the continuing pressure of the punches 38 and 36, the material is cured into a workpiece having exactly the right dimensions.

Since the material being molded has a substantial percentage of metal particles therein, the aforementioned heating may be carried out in a field of electromagnetic induction, if desired, and a somewhat more rapid molding cycle will result. It will be understood, however, that this in no way affects any of the other steps of the molding cycle.

As an optional procedure for forming the workpiece of this invention, the core member may first be briquetted in a mold 42 between the plungers 44 and 46, and around the core rod 48 as shown in Figure 4. Thereafter, the bearing member can be briquetted in a mold 50 and between the plungers 52 and 54 and around the core rod 56 as shown in Figure 5.

The resulting briquettes, when ejected from their respective molds, are assembled and placed in a third mold 58 wherein they are subjected to pressure by the upper and lower plungers 60 and 62 while simultaneously being heated either by the heating passages 64 in the mold or by a field of alternating electromagnetic induction. The bore in the bearing portion of a combined member is traversed by the core rod 66 for the purpose of sizing the bearing hole during the operation.

After the workpiece is completely molded and cured, it is ejected from the curing mold and is then ready for assembly with the other parts of the motor.

A combined magnetic core and bearing according to this invention has a bore through the bearing accurately aligned with the magnetic field structure which is supported on the outside of the core member. This maintains the rotor in accurate alignment with the magnetic field at all times. The core member itself, in addition to being economically formed by this process, exhibits good magnetic characteristics and has very low hysteresis and eddy current losses therein.

It will be understood that while this invention has been illustrated and described in connection with combined magnetic and bearing member to be utilized in connection with one type of electric motor, it will be understood that the principle of this invention could be applied to the manufacture of similar parts for other electrical equipment, or for other types of motors and that, accordingly, it is desired to comprehend such modifications within the scope of the appended claim.

I claim:

As a new article of manufacture; a substantially cylindrical bearing member composed of a mixture of graphite, metal powder and a binder to form a cylindrical bearing to receive a shaft; and a substantially cylindrical magnetic member molded directly around the periphery of said bearing member and physically united therewith and comprising a mixture of magnetic material and binder to support the said material in rigid form for mounting said article in a supporting housing.

LLOYD D. RICHARDSON.

REFERENCES CITED

The following references are of record in the file of this patent:

UNITED STATES PATENTS

| Number | Name | Date |
|--------|------|------|
| 1,390,197 | Dower | Sept. 6, 1921 |
| 1,392,174 | Kempton | Sept. 27, 1921 |
| 1,648,564 | Pattay | Nov. 8, 1927 |
| 1,851,586 | Knobel | Mar. 29, 1932 |
| 2,137,986 | Sanford | Nov. 22, 1938 |
| 2,159,327 | Hendrick | May 23, 1939 |
| 2,223,518 | Henberger | Dec. 3, 1940 |
| 2,302,564 | Megow | Nov. 17, 1942 |
| 2,387,073 | Horlacher | Oct. 16, 1945 |
| 2,397,626 | Shriver | Apr. 2, 1946 |